United States Patent
Reid et al.

(10) Patent No.: US 7,444,030 B2
(45) Date of Patent: Oct. 28, 2008

(54) IMAGE ENCODING WITH DYNAMIC BUFFER-CAPACITY-LEVEL-BASED COMPRESSION ADJUSTMENT

(75) Inventors: Donald M. Reid, Corvallis, OR (US); Airell R. Clark, II, Albany, OR (US)

(73) Assignee: Micron Technology, Inc., Boise, ID (US)

( * ) Notice: Subject to any disclaimer, the term of this patent is extended or adjusted under 35 U.S.C. 154(b) by 733 days.

(21) Appl. No.: 10/987,260

(22) Filed: Nov. 12, 2004

(65) Prior Publication Data

US 2006/0104524 A1 May 18, 2006

(51) Int. Cl.
*G06K 9/36* (2006.01)
*G06K 9/46* (2006.01)

(52) U.S. Cl. ...................... 382/239; 382/253

(58) Field of Classification Search ................ 382/164, 382/172, 173, 232, 233, 239, 244, 246, 250, 382/251, 253, 305; 708/402; 358/1.9, 448; 375/240.03, 240.18, 240.2, E7.145, E7.154
See application file for complete search history.

(56) References Cited

U.S. PATENT DOCUMENTS

| | | | |
|---|---|---|---|
| 5,734,755 A | 3/1998 | Ramchandran et al. | |
| 5,768,481 A | 6/1998 | Chan et al. | |
| 6,118,817 A | 9/2000 | Wang | |
| 6,233,359 B1 | 5/2001 | Ratnakar et al. | |
| 6,252,994 B1 * | 6/2001 | Nafarieh | 382/253 |
| 6,298,169 B1 * | 10/2001 | Guenter | 382/253 |
| 6,310,915 B1 * | 10/2001 | Wells et al. | 375/240.03 |
| 6,563,955 B2 * | 5/2003 | de Queiroz | 382/239 |
| 6,577,772 B1 | 6/2003 | Lee | |
| 6,658,157 B1 * | 12/2003 | Satoh et al. | 382/239 |
| 6,804,299 B2 * | 10/2004 | Moni et al. | 375/240.03 |
| 6,895,050 B2 * | 5/2005 | Lee | 375/240.03 |
| 6,956,901 B2 * | 10/2005 | Boroczky et al. | 375/240.03 |
| 7,130,348 B2 * | 10/2006 | Kerofsky | 375/240.03 |
| 7,200,276 B2 * | 4/2007 | Mehrotra | 382/239 |
| 7,236,640 B2 * | 6/2007 | Subramaniam et al. | 382/253 |

(Continued)

FOREIGN PATENT DOCUMENTS

EP 0637891 A2 4/1994

(Continued)

OTHER PUBLICATIONS

J.C. McKinney et al., "ATSC Digital Television Standard", Advanced Television Systems Committee, Doc. A/53, Oct. 4, 1995, pp. 34-38.

*Primary Examiner*—Amir Alavi
(74) *Attorney, Agent, or Firm*—Ratner Prestia

(57) ABSTRACT

Methods, systems, and computer programs for encoding images are described. In one aspect, quantized frequency domain vectors are sequentially generated from a sequence of blocks of the image. Each quantized frequency domain vector includes a set of quantized forward transform coefficients that are derived from a respective image block. For each successive quantized frequency domain vector, a current input capacity level of a buffer is determined and the quantized frequency domain vector is modified to increase compressibility when the current input capacity level is determined to be below a prescribed threshold. Modified and unmodified quantized frequency domain vectors are encoded into a sequence of encoded image blocks. The sequence of encoded image blocks is stored in the buffer.

27 Claims, 4 Drawing Sheets

U.S. PATENT DOCUMENTS

| | | | |
|---|---|---|---|
| 7,295,610 B2 * | 11/2007 | Schoenblum | 375/240.03 |
| 2003/0002581 A1 | 1/2003 | Moni et al. | |
| 2003/0185252 A1 | 10/2003 | Knee | |
| 2006/0104524 A1 * | 5/2006 | Reid et al. | 382/239 |

FOREIGN PATENT DOCUMENTS

| | | |
|---|---|---|
| EP | 1351519 A2 | 10/2003 |

* cited by examiner

IMAGE ENCODING WITH DYNAMIC BUFFER-CAPACITY-LEVEL-BASED COMPRESSION ADJUSTMENT

BACKGROUND

Incorporating imaging devices within portable electronic devices, such as digital cameras, cellular telephones and portable digital assistants, is especially challenging because these devices typically have only limited amounts of memory resources, processing resources, and power resources that can be diverted to image processing. To meet memory constraints, imaging devices for portable electronic devices typically include image processors that compress the images (e.g., in the JPEG compression format) before they are stored. In most image compression methods, certain image data is discarded selectively to reduce the amount of data that is needed to represent the image while avoiding substantial degradation of the appearance of the image. In general, the compression level of an image compression process varies with image content. For example, images with less detail can be compressed to a greater extent than images with more detail. Similarly, some areas of an image may be compressed to a greater extent that other areas.

Transform coding, as exemplified by the JPEG image compression method, involves representing an image by a set of transform coefficients. The transform coefficients are quantized individually to reduce the amount of data that is needed to represent the image. A representation of the original image is generated by applying an inverse transform to the transform coefficients. Block transform coding is a common type of transform coding method. In a typical block transform coding process, an image is divided into small rectangular regions (or "blocks"), which are subjected to forward transform, quantization, and coding operations. Many different kinds of block transforms may be used to encode the blocks. Among the common types of block transforms are the cosine transform (which is the most common), the Fourier transform, the Hadamard transform, and the Haar wavelet transform. These transforms produce an M×N array of transform coefficients from an M×N block of image data, where M and N have integer values of at least 1.

In addition to storing captured images in a compressed format, some digital cameras store compressed thumbnail images corresponding to reduced-resolution versions of the captured images. Many of these digital cameras impose a bit budget constraint on these compressed thumbnail images. In order to meet these bit budget constraints, some digital camera systems set to zero selected ones of the non-zero discrete cosine transform (DCT) coefficients of the thumbnail images regardless of their value. The process of selecting these DCT coefficients starts with the highest frequency coefficients and continues down to lower-frequency coefficients until the compressed image size is below maximum bit budget. In this approach, the number of passes through the DCT coefficient data depends on the bit budget, the original compressed image size, and the image content.

In another approach, the size of an existing JPEG file (or a set of DCT coefficients) is reduced to satisfy a bit budget by setting to zero all of the DCT coefficients that have values below a threshold and that occur after a cutoff ordinal number. In this approach, the cutoff ordinal number is determined by tracking the number of bits that are saved by each incremental reduction of the cutoff ordinal number and comparing the existing file size with the required bit budget. This approach requires two passes through the DCT coefficient data: a first pass during which the bit number savings are determined; and a second pass during which certain coefficients are set to zero.

In some application environments (e.g., camera-equipped cellular telephones), cost constraints prohibit the inclusion of sufficient memory resources, processing resources, and power resources to perform multiple passes through the image data. The above-described methods for reducing the size of a compress image therefore are not optimally suited for these types of application environments.

SUMMARY

In one aspect, the invention features a method of processing an image. In accordance with this inventive method, quantized frequency domain vectors are sequentially generated from a sequence of blocks of the image. Each quantized frequency domain vector includes a set of quantized forward transform coefficients that are derived from a respective image block. For each successive quantized frequency domain vector, a current input capacity level of a buffer is determined and the quantized frequency domain vector is modified to increase compressibility when the current input capacity level is determined to be below a prescribed threshold. Modified and unmodified quantized frequency domain vectors are encoded into a sequence of encoded image blocks. The sequence of encoded image blocks is stored in the buffer.

The invention also features a system and a computer program for implementing the above-described image processing method.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

Figure 1:
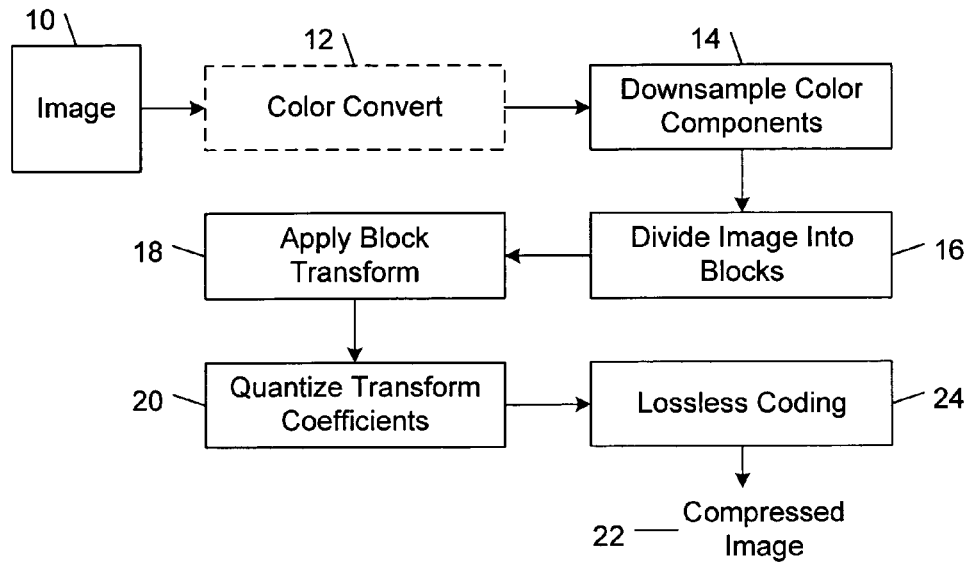
FIG. 1 is a flow diagram of a prior art JPEG image compression process.

FIG. 1 shows a prior art method of compressing an image 10 in accordance with the JPEG compression format. In accordance with this method, if the original image 10 is not already specified in a preselected color space, the original image 10 is converted into the preselected luminance-based color space (e.g., the YCrCb color space) (block 12). Each color plane of the image in the preselected color space corresponds to a respective image (i.e., an array of pixel values) that is processed individually as follows. The color components (e.g., the Cr and Cb color components) are downsampled (block 14). Each color plane is divided into blocks of pixels (e.g., 8×8 pixel blocks) (block 16). A DCT block transform is applied to each pixel block individually (block 18). The resulting DCT coefficients are quantized (block 20). The quantized transform coefficients are encoded using a lossless coding technique to produce a compressed image 22 (block 24).

As explained above in the Background section, some prior art image compression approaches set some of the DCT coefficient values to zero in order to meet a bit budget constraint. These methods, however, require multiple passes through the transform coefficient data and therefore are not optimally suited for applications where memory and processing resources are severely constrained. The embodiments described in detail below, on the other hand, dynamically adjust the compression level of an encoding process based on the current input capacity level of a buffer that is used to store the compressed image data. In this way, these embodiments can be implemented by an efficient serial image processing pipeline that requires reduced memory resources, processing resources, and power resources. In addition, implementations of these embodiments dynamically vary the levels at which different regions of an image are compressed. This allows these implementations to advantageously use additional resources when they become available. For example, these implementations may employ less compression (i.e., less data loss) in image regions at times when the current input capacity of the buffer is greater than a prescribed target level (e.g., after one or more efficiently-compressed regions of an image have been processed and stored in the buffer).

Figure 2:
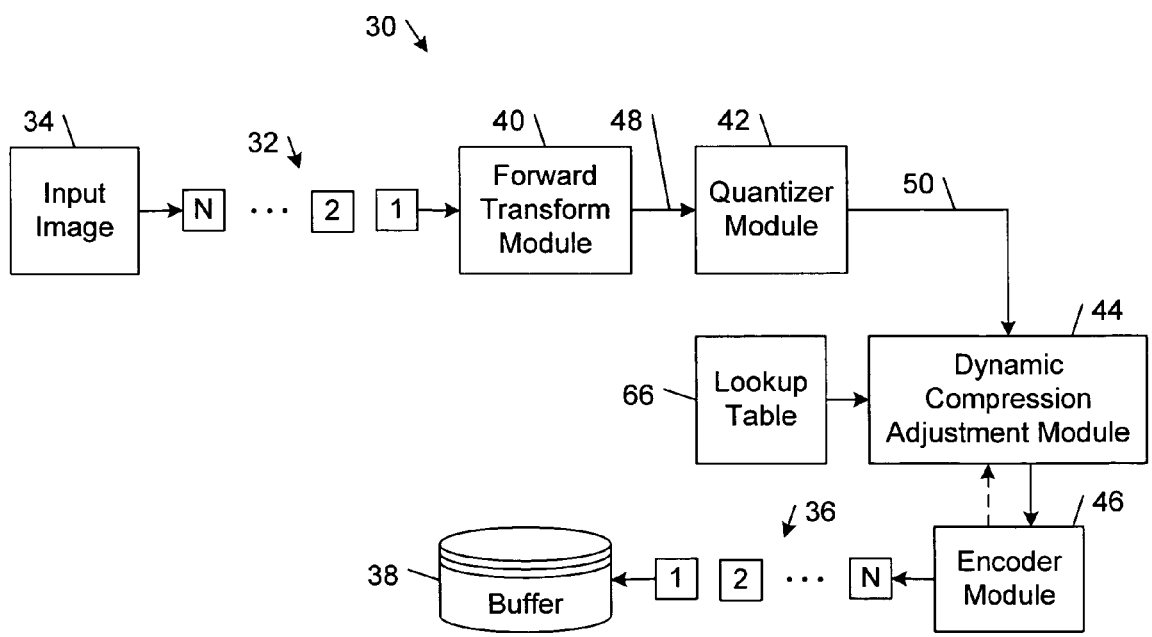
FIG. 2 is a block diagram of an embodiment of an image processing system.

FIG. 2 shows an embodiment of an image processing system 30 that is configured to convert a sequence of blocks 32 of an input image 34 into a sequence of encoded image blocks 36 that are stored in a buffer 38. The input image 34 may be a binary image (e.g., a dark and bright dot pattern), a multilevel single-color image (e.g., a gray-level image), or a multilevel multi-color image. In general, the image processing system 30 processes each color plane of the input image 34 individually.

The image processing system 30 includes a forward transform module 40, a quantizer module 42, a dynamic compression adjustment module 44, and an encoder module 46. In general, the modules 40-46 of the image processing system 30 are not limited to any particular hardware or software configuration, but rather they may be implemented in any computing or processing environment, including in digital electronic circuitry or in computer hardware, firmware, device driver, or software. For example, in some implementations, these modules 40-46 may be embedded in the hardware of any one of a wide variety of digital and analog electronic devices, including desktop and workstation computers, digital still image cameras, digital video cameras, printers, scanners, and portable electronic devices (e.g., mobile phones, laptop and notebook computers, and personal digital assistants).

Figures 8, 9:
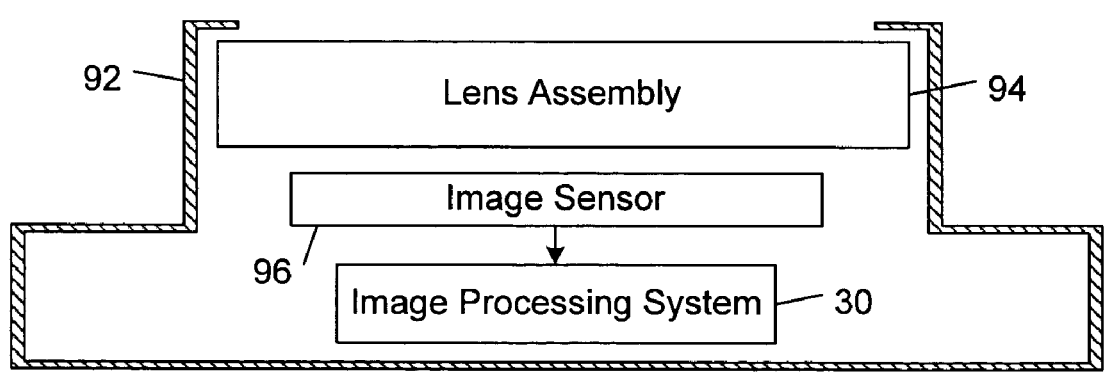
FIG. 8 shows a matrix containing the arrangement of 64 DCT coefficients shown in FIG. 3 with a set of cutoff coefficient index numbers highlighted.
FIG. 9 is a block diagram of an embodiment of a camera module that incorporates the image processing system of FIG. 2.

FIG. 9 shows an exemplary embodiment of a camera module 90 that facilitates the incorporation of the image processing system 30 into electronic devices. The camera module 90 includes a housing 92 that contains a lens assembly 94, an image sensor 96 (e.g., a CCD image sensor or a CMOS image sensor), and the image processing system 10.

Referring back to FIG. 2, in operation, the input image 34 is divided into the sequence of N image blocks 32, where N has a positive integer value. In some implementations, the input image 34 is decomposed into image blocks of 8×8 pixels by a raster-to-block converter, which may or may not be incorporated within the image processing system 30.

The forward transform module 40 computes a sequence of frequency domain vectors 48 from the sequence of image blocks 32. Each frequency domain vector contains a respective set of transform coefficients that is derived from a respective one of the N image blocks 32. The coefficients of the frequency domain vectors are computed by applying a frequency-domain transform D to the image blocks as follows:

$$B = D \times D^T \quad (1)$$

where X corresponds to an image block 32, $D^T$ corresponds to the transpose of transform D, and B corresponds to the transform coefficients of the image block X that form the frequency domain vector 48.

Any kind of block transform may be applied to the image blocks 32. Exemplary types of block transforms include the cosine transform, Fourier transform, Hadamard transform, and Haar wavelet transform. In some implementations, D is a block-based linear transform, such as a discrete cosine transform (DCT). In one dimension, the DCT transform is given to four decimal places by the following 8×8 matrix:

$$D = \begin{matrix} 0.3536 & 0.3536 & 0.3536 & 0.3536 & 0.3536 & 0.3536 & 0.3536 & 0.3536 \\ 0.4904 & 0.4157 & 0.2778 & 0.0975 & -0.0975 & -0.2778 & -0.4157 & -0.4904 \\ 0.4619 & 0.1913 & -0.1913 & -0.4619 & -0.4619 & -0.1913 & 0.1913 & 0.4619 \\ 0.4157 & -0.0975 & -0.4904 & -0.2778 & 0.2778 & 0.4904 & 0.0975 & -0.4157 \\ 0.3536 & -0.3536 & -0.3536 & 0.3536 & 0.3536 & -0.3536 & -0.3536 & 0.3536 \\ 0.2778 & -0.4904 & 0.0975 & 0.4157 & -0.4157 & -0.0975 & 0.4904 & -0.2778 \\ 0.1913 & -0.4619 & 0.4619 & -0.1913 & -0.1913 & 0.4619 & -0.4619 & 0.1913 \\ 0.0975 & -0.2778 & 0.4157 & -0.4904 & 0.4904 & -0.4157 & 0.2778 & -0.0978 \end{matrix} \quad (2)$$

In some other implementations, D is a wavelet-based decomposition transform. In one of these implementations, for example, D is a forward discrete wavelet transform (DWT) that decomposes a one-dimensional (1-D) sequence (e.g., line of an image) into two sequences (called sub-bands), each with half the number of samples. In this implementation, the 1-D sequence may be decomposed according to the following procedure: the 1-D sequence is separately low-pass and high-pass filtered by an analysis filter bank; and the filtered signals are downsampled by a factor of two to form the low-pass and high-pass sub-bands.

The quantizer module 42 quantizes the coefficients of the frequency domain vectors 48 that are generated by the forward transform module 40 to generate a sequence of quantized frequency domain vectors 50. In this process, a quantized frequency domain vector 50, which contains a set of quantized forward transform coefficients ($c_i$), is generated by uniformly quantizing the corresponding transform coefficients ($y_i$) of a respective frequency domain vector 48 with step sizes ($q_i$) in accordance with equation (3):

$$c_i = \text{round}(y_i/q_i) \quad (3)$$

The step sizes $q_i$ are stored in a quantization table or matrix that is stored with the compressed image data. In some implementations, each of the frequency domain vectors 48 and each of the quantized frequency domain vectors 50 contains sixty-four coefficients (i=0, 1, . . . , 63) that are organized into the zigzag sequence shown in FIG. 3, where the number in each box corresponds to the index number (i-value) of the coefficient. In these embodiments, the index number 0 corresponds to the DC coefficient and the remaining index numbers (1-63) correspond to the AC coefficients, which are ordered from the lowest AC frequency (i=1) to the highest AC frequency (i=63).

Figures 3, 4:
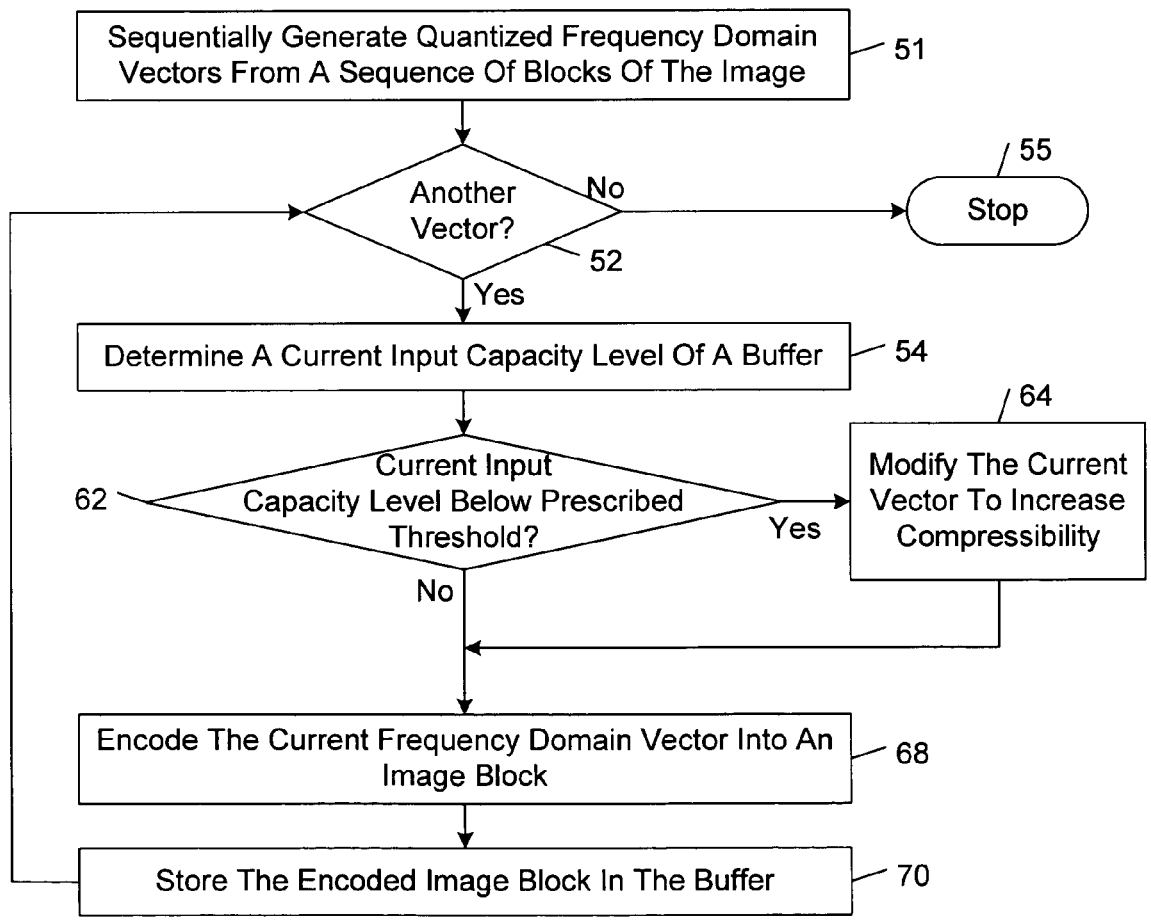
FIG. 3 shows a matrix containing a typical zigzag ordering of the 64 DCT coefficients for an image block in accordance with the JPEG image compression format.
FIG. 4 is a flow diagram of an embodiment of an image processing method that is implemented by the image processing system of FIG. 2.

FIG. 4 shows an embodiment of an image processing method that is implemented by the image processing system 30. In this method, the forward transform module 40 and the quantizer module 42 sequentially generate the quantized frequency domain vectors from a sequence of blocks of the input image 34, as described above (block 51).

If there is a quantized frequency domain vector 50 available for processing (block 52), the dynamic compression adjustment module 44 determines a current input capacity level of the buffer 38 (block 54). If all of the quantized frequency domain vectors 50 have been processed (block 52), the process terminates (block 55).

In some implementations, the buffer 38 is designed to store the entirety of the compressed image data that is generated by the image processing system 20. The fixed memory capacity of the buffer 38 sets an upper limit on the combined space required to store all the encoded image blocks 36 that are generated by the image processing system 30 for a given input image 34. In these implementations, the dynamic compression adjustment module 44 tracks the cumulative amount of buffer space being used to store the encoded image blocks 36 that are generated by the encoder module 46 and compares the tracked cumulative buffer space amount to a target cumulative buffer space level, which increases with the number of image blocks 32 that have been processed. The dynamic compression adjustment module 44 may track the cumulative buffer space amount by monitoring the size of each encoded image block 36 that is output from the encoder module 46 or by interrogating the buffer 38 for the current amount of used space.

Figure 5:
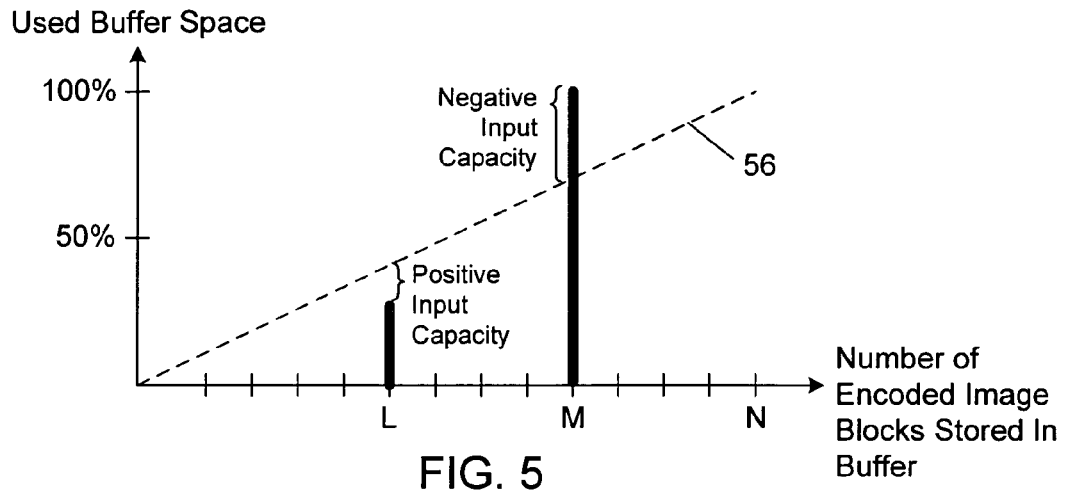
FIG. 5 is a graph of a target level of used buffer space plotted as a function of the number of image blocks stored in the buffer.

As shown in FIG. 5, in some implementations, the target cumulative buffer space level 56 increases linearly with the number of encoded image blocks 36 that are currently stored in the buffer 38. The current input capacity level of the buffer 38 corresponds to the difference between the target cumulative buffer space level 56 and the actual cumulative buffer space amount. If the actual amount of used buffer space is less than the target cumulative buffer space level 56 (e.g., after L blocks have been processed in the example shown in FIG. 5), then the current input capacity level is positive. If the actual amount of used buffer space is greater than the target cumulative buffer space level 56 (e.g., after M blocks have been processed in the example shown in FIG. 5), then the current input capacity level is negative.

Figure 6:
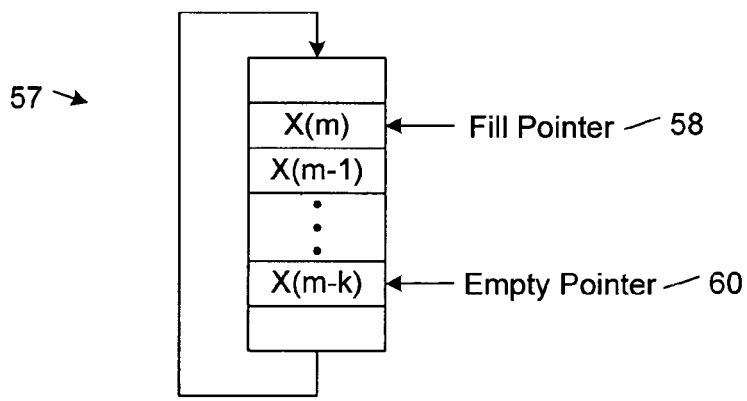
FIG. 6 is a diagrammatic view of a circular FIFO buffer.

Referring to FIG. 6, in some other implementations, the buffer 38 is implemented by a circular buffer 57 (e.g., a FIFO buffer). In a circular buffer pointers are moved through the data while new data samples are written above the previous data samples. A new data sample is written at the location pointed to by a fill pointer 58. After each new data sample is written, the fill pointer 58 is incremented. Data samples are read from the locations pointed to by an empty pointer 60. After each data sample is read, the empty pointer 60 is incremented. When the fill pointer 58 wraps around and reaches the empty pointer 60, a buffer overflow error occurs and data sample acquisition typically stops. To avoid buffer overflow errors in these embodiments, the dynamic compression adjustment module 44 tracks the current amount of free memory in the circular buffer 57. The current amount of free memory corresponds to the current input capacity level of the circular buffer 57. In some implementations, the dynamic compression adjustment module 44 computes the current input capacity level by computing the difference between the total memory capacity of the circular buffer 57 and the current amount of used space. The current amount of used space may be determined by computing the difference between the current empty point address and the current fill pointer address.

Referring back to FIG. 4, after the current input capacity of the buffer 38 has been determined (block 54), the dynamic compression adjustment module 44 compares the current input capacity level of the buffer 38 to a prescribed threshold (block 62). In general, the prescribed threshold may be determined empirically. In implementations in which the buffer 38 is designed to store the entirety of the compressed image data that is generated by the image processing system 20, the prescribed threshold may be zero. That is, in these implementations, the dynamic compression adjustment module 44 only modifies the current quantized frequency domain vector 50 when the actual cumulative buffer space amount is greater than the current target cumulative buffer space level. In implementations in which the buffer 38 is implemented by a circular buffer, the prescribed threshold may correspond to an empirically determined proportion of the total memory capacity of the circular buffer.

If the current input capacity level is at or above the prescribed threshold (block 62), the dynamic compression adjustment module 44 does not modify the current quantized frequency domain vector 50. Instead, the dynamic compression adjustment module 44 simply passes the unmodified current quantized frequency domain vector 50 to the encoder module 46 for encoding (block 68).

If the current input capacity level is below the prescribed threshold (block 62), the dynamic compression adjustment module 44 modifies the current quantized frequency domain vector 50 to increase compressibility (block 64). In particular, the dynamic compression adjustment module 44 reduces the values of coefficients in a selected set of coefficients corresponding to all of the coefficients of the quantized frequency domain vector above a cutoff coefficient in frequency (i.e., coefficients with indices above the index number of the cutoff coefficient).

Referring back to FIG. 2, the dynamic compression adjustment module 44 consults a lookup table 66 to identify the cutoff coefficient. The lookup table 66 maps the difference between the current input capacity level and the prescribed threshold to the coefficient number of the cutoff frequency coefficient. In general, the particular lookup table mapping of the difference between the current input capacity level and the prescribed threshold to the cutoff coefficient may be determined empirically.

Figure 7:
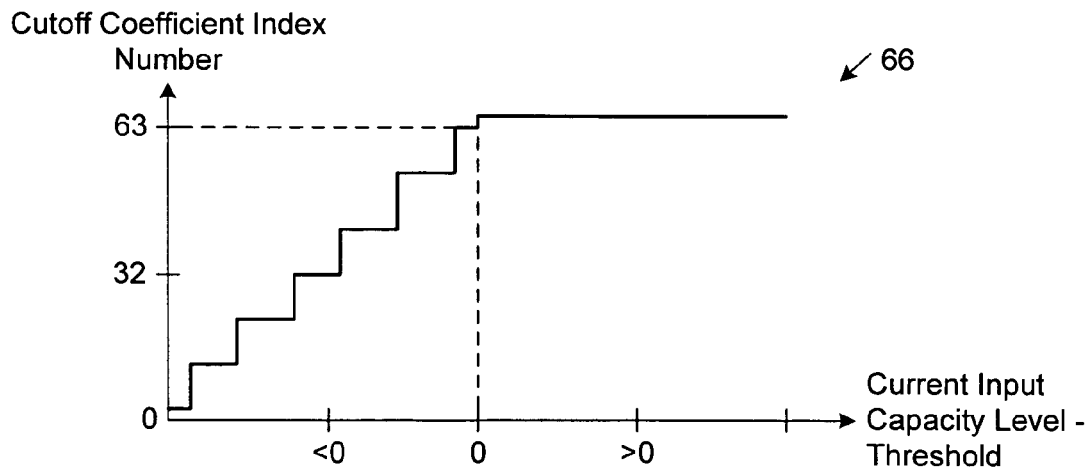
FIG. 7 is a graph mapping the difference between the current input capacity level of a buffer and a threshold to a cutoff coefficient index number.

FIG. 7 shows an exemplary mapping in which the number of coefficients whose values are to be reduced increases by an amount that increases with the degree that the current input capacity level is below the prescribed threshold. In this way, the compressibility of the current quantized frequency domain vector 50 is increased by an amount that increases with the degree that the current input capacity level is below the prescribed threshold. In some implementations, the lookup table 66 is designed to increase the compressibility of the current quantized frequency coefficient vector 50 by an amount selected so that the expected input capacity level of the buffer 38 is at or below the prescribed threshold level after the current quantized frequency domain vector has been encoded and stored in the buffer 38.

Referring to FIG. 8, in some implementations, the lookup table 66 maps the difference between the current input capacity level and the prescribed threshold to the limited set of cutoff coefficients that are highlighted in gray (i.e., coefficients 0, 2, 5, 9, 14, 20, 27, 35, 42, 48, 53, 57, 60, 62, and 63). Each of these cutoff coefficients is associated with a respective frequency-ordered sequence of the quantized forward transform coefficients that are symmetrically distributed with respect to the orthogonal spatial axes (e.g., the x-axis and the y-axis) of the input image 34.

The dynamic compression adjustment module 44 increases the compressibility of the current quantized frequency domain vector 50 by reducing the values of the coefficients above the cutoff frequency coefficient and thereby increasing the ability of the encoder module 46 to compress the quantized frequency domain vectors. The coefficient values may be reduced to zero or they may be reduced to non-zero values by a scaling factor. The scaling factor may have the same value for all of the coefficients or it may have a value that is larger for higher frequency coefficients than it is for lower frequency coefficients.

Referring back to FIG. 4, the encoder module 46 encodes the current (modified or unmodified) quantized frequency domain vector that is output from the dynamic compression adjustment module 44 into an encoded image block 36 (block 68). In some implementations, the encoder module 46 encodes the current quantized frequency domain vector using a lossless coding technique. In some implementations, the encoder module 46 encodes the DC coefficients using a differential prediction process and encodes the AC coefficients using a run-length encoding process. The encoder module 46 additionally encodes the quantized DC and AC coefficients using an entropy encoding process (e.g., a Huffman encoding process or an arithmetic encoding process).

After the quantized forward transform coefficients of the current quantized frequency domain vector have been encoded into an image block 36 (block 68), the encoded image block 36 is stored in the buffer 38 (block 70). The process is then repeated for the next successive quantized frequency domain vector 50 (blocks 52, 54, 62, 64, 68, 70).

Other embodiments are within the scope of the claims.

The systems and methods described herein are not limited to any particular hardware or software configuration, but rather they may be implemented in any computing or processing environment, including in digital electronic circuitry or in computer hardware, firmware, or software. In general, the systems may be implemented, in part, in a computer process product tangibly embodied in a machine-readable storage device for execution by a computer processor. In some embodiments, these systems preferably are implemented in a high level procedural or object oriented processing language; however, the algorithms may be implemented in assembly or machine language, if desired. In any case, the processing language may be a compiled or interpreted language. The methods described herein may be performed by a computer processor executing instructions organized, for example, into process modules to carry out these methods by operating on input data and generating output.

What is claimed is:

1. A method of processing an image, comprising:
sequentially generating quantized frequency domain vectors from a sequence of blocks of the image, wherein each quantized frequency domain vector comprises a set of quantized forward transform coefficients derived from a respective image block;
for each successive quantized frequency domain vector, determining a current input capacity level of a buffer and modifying the quantized frequency domain vector to increase compressibility when the current input capacity level is determined to be below a prescribed threshold;
encoding modified and unmodified quantized frequency domain vectors into a sequence of encoded image blocks; and
storing the sequence of encoded image blocks in the buffer.

2. The method of claim 1, wherein the determining of the current input capacity level comprises determining a current amount of used memory in the buffer relative to a target level of used memory.

3. The method of claim 2, wherein the target level of used memory increases with number of encoded image blocks stored in the buffer when the current input capacity level is determined.

4. The method of claim 2, wherein the input capacity level equals the target level of used memory less the current amount of used memory.

5. The method of claim 4, wherein the prescribed threshold is zero.

6. The method of claim 1, wherein the determining of the current input capacity level comprises determining a current amount of free memory in the buffer.

7. The method of claim 6, wherein the prescribed threshold corresponds to a target amount of free memory.

8. The method of claim 1, wherein the modifying of the quantized frequency domain vector comprises increasing compressibility of the quantized frequency domain vector by an amount that increases with degree of separation between the current input capacity level and the prescribed threshold.

9. The method of claim 1, wherein the modifying of the quantized frequency domain vector comprises identifying a set of the quantized forward transform coefficients above a cutoff coefficient in frequency.

10. The method of claim 9, wherein the coefficients in the identified set are distributed symmetrically with respect to two orthogonal spatial axes.

11. The method of claim 9, wherein identifying the coefficients comprises mapping the current input capacity level to the cutoff coefficient.

12. The method of claim 9, wherein the modifying of the quantized frequency domain vector comprises reducing values of the coefficients in the identified set of coefficients.

13. The method of claim 12, wherein the reducing of coefficient values comprises setting each of the coefficients in the identified set to a value of zero.

14. A system for processing an image, comprising:
a forward transform module configured to sequentially generate frequency domain vectors from a sequence of blocks of the image, wherein each frequency domain vector comprises a set of forward transform coefficients derived from a respective image block;
a quantizer module configured to sequentially generate quantized frequency domain vectors from the frequency domain vectors generated by the forward transform module;
a dynamic compression adjustment module configured to, for each successive quantized frequency domain vector, determine a current input capacity level of a buffer and to modify the quantized frequency domain vector to increase compressibility when the current input capacity level is determined to be below a prescribed threshold;
encoder module configured to encode modified and unmodified quantized frequency domain vectors into a sequence of encoded image blocks and to store the sequence of encoded image blocks in the buffer.

15. The system of claim 14, wherein the dynamic compression adjustment module is configured to determine a current amount of used memory in the buffer relative to a target level of used memory.

16. The system of claim 15, wherein the target level of used memory increases with number of encoded image blocks stored in the buffer when the current input capacity level is determined.

17. The system of claim 15, wherein the input capacity level equals the target level of used memory less the current amount of used memory.

18. The system of claim 17, wherein the prescribed threshold is zero.

19. The system of claim 14, wherein the dynamic compression adjustment module is configured to determine a current amount of free memory in the buffer.

20. The system of claim 19, wherein the prescribed threshold corresponds to a target amount of free memory.

21. The system of claim 14, wherein the dynamic compression adjustment module is configured to increase compressibility of the quantized frequency domain vector by an amount that increases with degree of separation between the current input capacity level and the prescribed threshold.

22. The system of claim 14, wherein the dynamic compression adjustment module is configured to identify a set of the quantized forward transform coefficients above a cutoff coefficient in frequency.

23. The system of claim 22, wherein the coefficients in the identified set are distributed symmetrically with respect to two orthogonal spatial axes.

24. The system of claim 22, wherein the dynamic compression adjustment module is configured to map the current input capacity level to the cutoff coefficient.

25. The system of claim 22, wherein the dynamic compression adjustment module is configured to reduce values of the coefficients in the identified set of coefficients.

26. The system of claim 25, wherein the dynamic compression adjustment module is configured to set each of the coefficients in the identified set to a value of zero.

27. A computer readable storage medium including a program for processing an image, the computer program residing on a computer-readable medium and comprising computer-readable instructions for causing a computer to:
sequentially generate quantized frequency domain vectors from a sequence of blocks of the image, wherein each quantized frequency domain vector comprises a set of quantized forward transform coefficients derived from a respective image block;
for each successive quantized frequency domain vector, determine a current input capacity level of a buffer and modify the quantized frequency domain vector to increase compressibility when the current input capacity level is determined to be below a prescribed threshold;
encode modified and unmodified quantized frequency domain vectors into a sequence of encoded image blocks; and
store the sequence of encoded image blocks in the buffer.

* * * * *